P. E. SCHELL & H. W. SCHLUTER.
UPHOLSTERY FASTENING MEANS.
APPLICATION FILED SEPT. 18, 1916.
1,266,862.
Patented May 21, 1918.
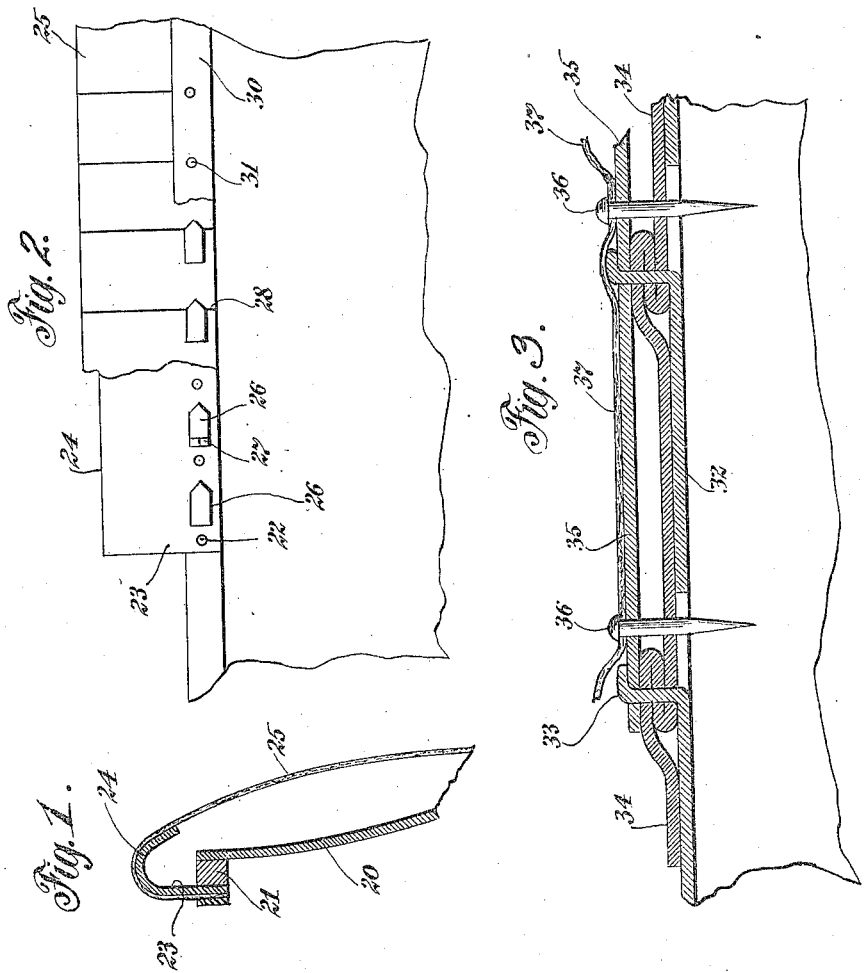

UNITED STATES PATENT OFFICE.

PAUL E. SCHELL AND HERBERT W. SCHLUTER, OF DETROIT, MICHIGAN.

UPHOLSTERY-FASTENING MEANS.

1,266,862.     Specification of Letters Patent.     Patented May 21, 1918.

Application filed September 18, 1916. Serial No. 120,701.

*To all whom it may concern:*

Be it known that we, PAUL E. SCHELL and HERBERT W. SCHLUTER, citizens of the United States of America, residing at Detroit, in the county of Wayne and State of Michigan, have invented certain new and useful Improvements in Upholstery-Fastening Means, of which the following is a specification, reference being had therein to the accompanying drawings.

This invention relates to upholstery fastening means, and the primary object of our invention is to provide simple and effective means, in a manner as hereinafter set forth, that may be used in connection with wood or metallic supports for securely holding upholstery, the fastening means permitting of the upholstery being easily and quickly placed in position without resorting to the usual tacks or nails for such purposes.

Another object of our invention is to provide upholstery fastening means that can be advantageously used in connection with wood or metallic automobile bodies, and the fastening means is so designed as to assist in maintaining plaits, tucks or other formations in connection with the upholstery.

A further object of our invention is to provide upholstery fastening means wherein the fastening elements are constructed with a view of reducing the cost of manufacture and at the same time retain the features by which durability and ease of assembling are secured. With such ends in view, our invention resides in the novel construction, combination and arrangement of parts to be hereinafter specifically described. Reference will now be had to the drawing, wherein—

Figure 1 is a vertical sectional view of a portion of a seat back showing upholstery held in accordance with our invention;

Fig. 2 is a rear elevation of the same illustrating the manner of assembling the upholstery fastening means; and Fig. 3 is a longitudinal sectional view of upholstery fastening means, illustrating another arrangement.

Considering the upholstery of automobile bodies, it is the present practice to construct the upholstery and properly shape the same, in molds or otherwise and this formed upholstery is tacked on trimmer rails and then the trimmer rails secured to the automobile body. In connection with metallic automobile bodies, it is necessary to provide properly placed wood supports to which trimmer rails may be connected and with either wood or metallic automobile bodies, there are numerous operations to be performed in properly placing upholstery. Our invention aims to reduce the number of operations heretofore necessary in connection with such work, and consequently reduce the cost of this particular branch of the automobile industry.

In Figs. 1 and 2, a portion of a metallic automobile body 20 has a wood trimmer rail 21 and connected thereto by nails or other fastening means 22 is a trimmer plate 23, said plate having the upper edge thereof rolled, as at 24 to shape upholstery 25 at the upper edge of the seat back. The trimmer plate 23 is cut and stamped, as at 26 to provide prongs 27 and these prongs are adapted to extend through the plaits 28 of the upholstery 25 to maintain said plaits and connect the upholstery to the trimmer plate. A binder strip 30 may be employed to cover the edge of the upholstery and this binder strip may be held by tacks 31 passing through the cut away portion of the plate 23 provided by striking out the prongs 27.

As shown in Fig. 3, a trimmer plate 32 may have the prongs 33 thereof holding the plaits of upholstery 34 also a fastener strip 35. This strip may be apertured to receive tacks 36 for holding a binder 37.

The preferred embodiments of our invention have been shown, but it is to be understood that the invention is susceptible to such changes in size, shape and manner of assemblage as fall within the scope of the appended claims.

What we claim is:—

1. Upholstery fastening means comprising a trimmer plate, outstruck prongs carried thereby and providing openings in said trimmer plate, upholstery having plaited portions thereof held by said prongs, a binder on the upholstery, and means extending through the openings of said trimmer plate to hold said binder relative to said upholstery.

2. Upholstery fastening means comprising a trimmer plate, prongs struck from said plate and providing openings, upholstery having plaited portions thereof held by said prongs, a fastener retained on the upholstery by said prongs, a binder on said fastener, and fastening means for said binder extending through said fastener, said upholstery, and the openings of said trimmer plate.

In testimony whereof we affix our signatures in presence of two witnesses.

PAUL E. SCHELL.
HERBERT W. SCHLUTER.

Witnesses:
C. R. STICKNEY,
ANNA M. DORR.

Copies of this patent may be obtained for five cents each, by addressing the "Commissioner of Patents, Washington, D. C."